United States Patent Office 3,278,463
Patented Oct. 11, 1966

3,278,463
MODIFIED SULFONATED CROSS-LINKED
ARYL CATALYTIC RESINS
Robert J. O'Neill, Glendale, and Thomas C. Tesdahl,
Creve Coeur, Mo., assignors to Monsanto Company, a
corporation of Delaware
No Drawing. Filed Mar. 2, 1961, Ser. No. 92,739
18 Claims. (Cl. 260—2.2)

The present invention relates to improved catalysts useful in the production of alkylated phenols, and to methods for the preparation of such catalysts. This application is a continuation-in-part of application Serial No. 21,872, filed April 13, 1960, and now abandoned.

The use of certain resinous materials as catalysts for the alkylation of phenols has been previously proposed but no catalyst of this type has achieved any substantial degree of commercial importance. A primary reason for this is that the resin catalysts heretofore available have not had a satisfactory degree of catalytic activity. Acidic inorganic catalysts having a high degree of catalytic activity are available but are objectionable for the reason that they are difficult to separate from the reaction mixture, require frequent replenishment, or result in the production of objectionable quantities of by-products.

It is a primary object of this invention to provide synthetic resin materials having sufficient catalytic activity that they can readily be employed to obtain a commercially satisfactory conversion of an olefin-phenol mixture to an alkylated phenol product.

It is another object of the invention to provide resin catalyst materials useful at low temperatures that do not result in excessive by-product formation in alkylation reactions, that do not require frequent replenishment, and that can be readily separated from an alkyl phenol mixture.

It is a further object of the invention to provide a novel method for the production of improved resin catalysts free from the disadvantages of prior art catalysts useful in the alkylation of phenols.

The above as well as other objects of the invention are achieved by heating a mixture of phenol and a sulfonated aryl ion exchange resin to effect a condensation reaction as evidenced by the release of water, the reaction being conducted under such conditions that the released water is removed from the reaction mixture. The thus modified ion exchange resin is a highly active catalyst that can be employed in otherwise conventional procedures to effect ring substitution of phenols.

It has been found that a process in accordance with this invention results in one or more condensation reactions between the sulfonic acid groups of an ion exchange resin material and the hydrocarbon rings of phenol. If the process is conducted under mild conditions, the predominant reaction is one in which each phenol nucleus reacts with only a single sulfonic acid group in accordance with the following equation:

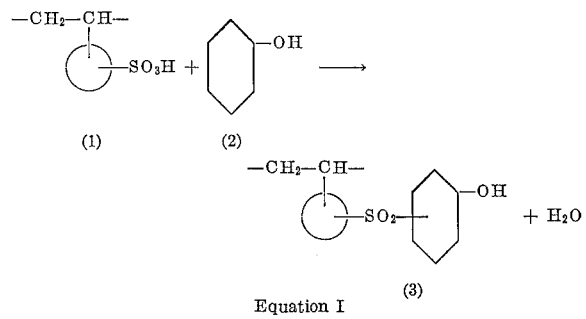

Equation I wherein the circle, in each instance, represents a monocyclic or dicyclic aryl nucleus normally present in the ion exchange resin employed as a starting material. The aryl nucleus can be unsubstituted except for the single —SO₃H group shown, can have one or more additional —SO₃H substituents, or can be substituted with one or more groups such as lower alkyl or halogen as determined by the nature of the vinyl compound or mixture of vinyl compounds used in making the resin. If higher reaction temperatures are employed, the reaction proceeds one step further so that many of the phenol nuclei react, in each instance, with a second sulfonic acid group in accordance with the following equation:

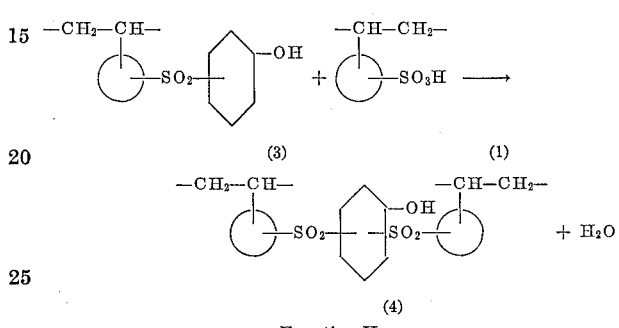

Equation II wherein the circles are as previously defined. It will be noticed that in this reaction, which results in hydroxyphenylsulfonyl substituents being transformed into disulfonylhydroxyphenyl groups serving to cross-link two aryl nuclei of the synthetic aryl resin, aditional water is released but no additional phenol is consumed.

As far as is known, no compound containing groups even remotely resembling the groups of Formulae 3 and 4 above has been previously demonstrated to have catalytic activity in phenol alkylation reactions, and it is believed to be quite surprising that resins containing such groups are much more active catalysts than corresponding resins containing only groups of Formula 1. One reason why this is true is that the formation of groups of Formulae 3 and 4 results in a reduction in the acidity of the resin and most, if not all, materials which have heretofore been found to have a high degree of catalytic activity in phenol alkylation reactions are strongly acidic in nature. It is equally surprising that resins containing groups of Formula 4 are even better catalysts than corresponding resins containing only groups of Formulae 1 and 3, and this invention demonstrates once again that catalysis is but vaguely understood.

The extent to which a reaction between an ion exchange resin and phenol is effected in accordance with this invention can be determined by several criteria. First, one can measure the amount of water liberated as a result of chemical reaction and this will provide an indication as to the extent which the reactions illustrated by Equations I and II above have occurred. A measurement of the water liberated will not, standing alone, provide any indication as to whether both reactions are occurring or only the reaction of Equation I is occurring because both reactions result in the liberation of water. As a general rule a moderately active catalyst is produced when the amount of water liberated by chemical reaction is equal to only about 0.2% to 0.5%, on a dry weight basis, of the weight of the starting resin, but for best results the amount of water liberated should be equal to at least about 1% of the weight of the dry resin starting material. Measurement of the water liberated by the resin can be somewhat misleading as to the extent of reaction which has occurred unless it is remembered that it is substantially impossible to remove all of the chemically uncombined water from the starting resin material by normal drying procedures and that the phenol and other material employed may contain small amounts of water. Even when a typical resin is dried for about 15 hours at 110° C. it has been found that the resin material may contain as much as about 1% of chemically uncombined water and that this water as well as at least a portion of that initially present in the phenol is removed along with the water produced by chemical reaction in the practice of this invention.

A second type of measurement which has been found to be useful in determining the extent of reaction is a measure of the weight gained by the resin material as a result of chemical combination. Weight gain, standing alone, will not allow one to determine whether the reaction illustrated by Equation II above has taken place or if the reaction has been entirely of the type represented by Equation I; however, by comparing the weight gain with the amount of water liberated, one can make an approximation of the extent to which the reaction of Equation II has occurred. A reasonably active catalyst usually can be prepared by conducting the reaction only until the weight gain of the resin starting material is about 1% or 2% but for the highest degree of activity the gain in weight of the starting resin material should generally be at least about 6% on a dry weight basis. Expressed in different terms, the reaction should be conducted until about 1 to 2% of the resin weight is attributable to phenol nuclei ($C_6H_3OH$ or $C_6H_4OH$ groups) and preferably at least until about 6% of the weight of the resin can be attributed to phenol nuclei.

Still another measurement which is useful in determining the extent of reaction is the "apparent acidity" of the resin material before the after reaction and a detailed procedure for determining apparent acidity will be set forth in the examples to follow, as will detailed procedures for determining the other variables which are being here discussed. Apparent acidity is proportional to the free sulfonic acid groups present in the resin material and decreases with increasing degrees of reaction. As a general rule, a reasonably active catalyst is obtained if the reduction in apparent acidity is as little as about 0.2 to 0.6 milliequivalent per gram but for best results the reduction in apparent acidity should be at least about 2 milliequivalents per gram of starting resin material on a dry weight basis. "Total acidity," which is an approximation of acidity including that provided by phenolic hydroxy groups, is another variable which can be measured to determine the extent of reaction, and by comparing the measured values of apparent acidity and total acidity with each other and with the values of the other variable mentioned above, one has additional tools for ascertaining to what extent the reaction of each of Equations I and II has occurred.

The maximum extent to which the reaction between a sulfonated aryl resin and phenol can be effected in accordance with this invention depends upon the extent to which the resin was sulfonated during manufacture. This is not, however, a matter of great concern in so far as the present invention is concerned because there is no danger of allowing the reaction to proceed too far, and even if the reaction between the resin and phenol is conducted to the maximum practical extent, an excellent catalyst is still obtained. With the sulfonated resins which are presently commercially available it is generally inexpedient to effect the reaction beyond the point where the resin has lost 60% to 90% of its apparent acidity. Expressed in terms of the other variables mentioned above, this means that the weight gain of the resin material and the weight percent of the resin attributable to the phenol nuclei are not normally more than about 20% to 25%, the amount of water liberated, in terms of percent by weight of the starting resin material, is not more than about 8% to 10%, and the maximum feasible reduction in apparent acidity is about 4 to 6 milliequivalents per gram.

Any suitable manipulative procedure can be employed for effecting a reaction between a sulfonated aryl ion exchange resin and phenol in accordance with this invention, but a preferred procedure comprises utilizing a diluent capable of forming an azeotrope with water so that the water formed by chemical reaction is removed from the reaction mixture by azeotropic distillation. Water immiscible aromatic hydrocarbons, such as toluene and xylene, are preferred for this purpose for the reason, among others, that the use of such a material permits one to readily separate the components of the azeotrope and to return the inert diluent to the reaction mixture. As an alternative to employing a diluent capable of forming an azeotrope with water, one can employ a diluent having a boiling point substantially above that of water and substantially below that of phenol to effect vapor distillation of the liberated water from the reaction mixture. An example of a suitable diluent of this type is an olefin material identical to that which is to be subsequently employed with the catalyst in the alkylation of phenolic compounds. In other words, if the catalyst is to be employed to alkylate phenol with dodecene, one can employ dodecene as a diluent to facilitate the removal of water from the reaction mixture during the formation of the catalyst. This procedure has the advantage that it minimizes the possibility of product contamination during initial periods of use of the catalyst. The active catalyst can be prepared in the absence of any inert diluent at all but such a procedure is not generally advantageous due at least partially to the solubility of water in hot phenol.

The amount of phenol with which a sulfonated aryl ion exchange resin is mixed in preparing the new catalysts can be varied within reasonably wide limits as long as enough phenol is present to fulfill the requirements of the reaction, but preferably a several hundred percent excess over reaction requirements is employed. This favors a complete reaction and the excess phenol serves as a carrier for the resin. In place of phenol one can partially or wholly substitute a phenol liberating compound if conditions are employed such that said compound produces phenol in situ during the reaction. For example, under suitable conditions one can substitute for the phenol normally added to the reaction mixture an alkyl phenol such as dodecyl phenol or dioctyl phenol. Near the upper limit of the range of temperatures suitable for use with this invention, sufficient dealkylation of the alkyl phenol will occur in the presence of the ion exchange resin to provide the phenol necessary for the formation of the catalyst, and if other conditions are proper, a reasonably active catalyst will be produced. Such procedures are, however, seldom if ever advantageous and preferably the phenol necessary for catalyst formation is added to the reaction mixture as such rather than being formed in situ during the reaction.

The temperature to which the resin-phenol mixture must be heated to achieve a satisfactory degree of reaction depends upon a number of factors, including the specific nature of the resin employed and the nature of the materials in the presence of which the heating operation is conducted, but a temperature of at least about 140° C. should be used. That such a high temperature can be employed is believed to be somewhat surprising in view of the fact that trade literature most frequently gives a temperature approximating this as being the upper temperature limit for stability of the sulfonated aryl ion exchange resins. It has been found, however, that this type of resin can generally be heated in the presence of phenol to temperatures of from about 170 to 200° C. or higher without excessive undesirable modification, and excessive resin degradation is the controlling factor in determining the maximum temperature at which a process in accordance with this invention can be performed. The preferred temperature range for catalyst preparation in accordance with this invention is from about 160 to 180° C. At temperatures below about 160° C. it is frequently necessary to employ a diluent which azeotropes with water and even then the reaction may be largely limited to that of Equation I, and at temperatures much above about 180 C. pressure must be employed to prevent the loss of phenol from the reaction mixture.

The time required for a satisfactory degree of reaction also depends upon a number of variables, including temperature, the specific nature of the starting resin material, and the nature of the liquids in the presence of which the resin is heated. Under favorable conditions a reasonably satisfactory degree of reaction can be obtained in 15 minutes or less, but for best result the resin material is preferably heated under dehydrating conditions for a total of from 30 minutes to 4 hours. There is no upper time limit for the heating operation and temperatures of about 170° C. for total periods of time of as much as about 20 hours have been employed with excellent results. As a practical matter, however, the heating operation should generally be limited to a total of no more than about 12 hours.

The sulfonated aryl resins which can be employed in accordance with this invention are known materials and numerous examples of such resins are commercially available. Such resins comprise in each instance a polymer of a mono-vinyl aryl compound sufficiently cross-linked, preferably with a polyvinyl aryl compound, to provide satisfactory dimensional stability without excessively limited porosity. Examples of suitable mono-vinyl aryl compounds employed in the formation of such resins include styrene, vinyl toluenes, vinyl naphthalenes, vinyl ethyl benzenes, alpha-methyl styrene, vinyl chlorobenzenes and vinyl xylenes. Examples of suitable polyvinyl aryl compounds which can be employed for cross-linking purposes include divinyl benzenes, divinyl toluenes, divinyl naphthalenes, divinyl xylenes, divinyl ethyl benzenes, divinyl chlorobenzenes and divinyl-phenyl vinyl ethers. The amount of cross-linking should be sufficient to prevent gel formation by the resin in the presence of phenols but insufficient to result in the porosity of the resin being reduced to such an extent that the resin cannot readily be permeated by organic liquids. This means that the mol percent of cross-linking agent employed in the formation of the resin should be from about 1% to about 16% and preferably from about 2% to about 8%. The degree of sulfonation necessary for satisfactory results is that amount necessary to provide an acidity, with the resin in the free acid state, of at least about 1 milliequivalent per gram and preferably at least about 3 milliequivalents per gram. There is no upper limit as to the degree of sulfonation, as far as usefulness in this invention is concerned, but as a practical matter it is seldom economically advantageous to produce sulfonated aryl resins having an acidity above about 6 milliequivalents per gram. A preferred resin for use in this invention is a styrene-divinyl benzene copolymer but this preference is based primarily upon cost and availability and as far as is known, if the acidity and physical form of the resin are satisfactory, the nature of the aryl groups in the resin is of little importance.

Any alkylatable, phenolic type compound which can be alkylated using conventional catalysts can be alkylated using a catalyst made in accordance with this invention, and this includes substantially all monocyclic aromatic hydroxy compounds having an unsubstituted ortho or para position. Illustrative examples of suitable phenolic compounds include phenol; the cresols or other lower alkyl phenols having a free para or ortho position, such as the ethyl phenols and the propyl phenols; and less widely employed phenolic compounds such as the xylenols, carvacrol, thymol, pyrocatechol, resorcinol, quinol, pyrogallol, phloroglucinol, guaiacol, orcinol and hydroquinone. In view of this discussion, other suitable phenols will be readily apparent to those skilled in the art.

Olefin compounds that can be employed for ring substitution of phenols using a catalyst made in accordance with this invention include straight chain olefins such as n-amylene and n-nonene, secondary olefins such as secondary-amylene and tertiary olefins such as t-butylene. The position of the unsaturation is generally immaterial and one can employ alpha olefins as well as olefins in which the unsaturation is remotely disposed with respect to the terminal carbon atoms. The polymers of propylene and butylene having a total number of carbon atoms of from 8 to 25 are generally useful and one can suitably employ, for example, propylene, tetramer, propylene pentamer, and isobutylene trimer materials. Under proper conditions cycloaliphatic olefins, as illustrated by cyclohexene, and aromatic olefins such as styrene can be utilized. One can also employ other types of unsaturated materials as illustrated by aliphatic acids such as oleic acid, diolefins such as butadiene, and halogenated olefins. Under proper conditions there can also be employed materials which are readily transformed into olefins such as secondary and tertiary alcohols, alkyl halides, and ethers such as di-tertiary butyl ether. Generally, any olefin acting compound which can be satisfactorily employed in prior art procedures for substituting the aromatic ring of a phenolic compound with an aliphatic side chain is useful with a catalyst made in accordance with this invention.

The manipulative procedure for performing alkylation reactions using a catalyst made in accordance with this invention can be conventional and a suitable procedure comprises placing a mixture of an olefin and a phenol in proper ratio in a reaction vessel provided with suitable means for agitation and adding a suitable quantity of catalyst. An excess of phenol is preferably employed since this provides a more workable mixture in terms of viscosity, and provides better over-all yields. Ratios of as high as 5 parts phenol to 1 part by weight of olefin can be employed with satisfactory results, but preferably the phenol-olefin ratio is from 1.2:1 to 3.5:1. Other expedients of this type conventionally employed in phenol alkylation reactions can also usually be employed when using a catalyst in accordance with this invention.

The amount of the activated catalyst required for satisfactory results depends upon the particular manipulative procedure employed for conducting the alkylation reaction and upon the rate at which it is desired that the reaction proceed. In a simple batch procedure satisfactory results can be achieved by employing as little as about 1% catalyst, based on the total weight of olefin material, up to such a large amount of catalyst that the reaction mixture can be stirred only with difficulty. Generally alkylation reactions proceed at a most desirable rate under optimum conditions when there is employed an amount of the catalyst equal to from about 25% to 75% by weight of the olefin acting material.

The particle size of the resin catalyst may vary within wide limits and one may satisfactorily employ material as coarse as 4 or 5 mesh or even coarser if desired but as a general rule the larger the particle size of the catalyst material, the lower the activity of the catalyst. On the other extreme, one can employ a catalyst material having a particle size down to 200–400 but the use of a catalyst having an exceedingly small particle size makes filtration necessary for catalyst recovery, whereas with the use of a catalyst having a larger particle size it is possible for one to recover the catalyst by a simple decantation procedure. In most instances, best results are obtained with catalysts having particle sizes ranging from 20–50 to 100–200 mesh.

The time required for a satisfactory degree of reaction when using one of the new catalysts of this invention depends primarily upon catalyst to reactant ratio, temperature, and the particle size and other characteristics of the catalyst employed. A reasonably complete reaction, i.e., about 80% to 90% conversion, usually can be obtained in about 3 hours at 100° C. with most types of reactants using 50%, based on olefin weight, of catalyst. Under similar conditions and with a temperature of 150° C., a correspondingly complete reaction can usually be obtained in one hour or less. At 40° C. a satisfactory reaction can generally be obtained in from about 80 to about 150 hours under proper conditions. For purposes of comparison it is interesting to note that with most if not all types of reactants a 90% conversion at 100° C. with a conventional resin catalyst cannot be obtained under any reaction conditions. Low reaction temperatures result in better catalyst life, less color in the product, less by-product formation, and higher para to ortho ratio, and a preferred reaction temperature is from 80° C. to 125° C. Even reaction temperatures in this range are not required for a desirable rate and degree of reaction where the olefin is a relatively pure, highly reactive material but such temperatures are advantageous where, as in most instances, the olefin material comprises a mixture containing a percentage of olefins which react only with difficulty.

The invention will now be illustrated by the following specific examples in which all parts are by weight unless otherwise indicated:

EXAMPLE I.—CATALYST ACTIVATION

*Procedure A*

In a suitable reaction vessel there is placed 80.4 parts of dry 20–50 mesh particulate resin material resulting from the sulfonation of a styrene divinyl benzene copolymer formed with about 4% by weight of divinyl benzene (Dowex 50W–X4; Dow Chemical Company, U.S.A.). Drying of the resin can be effected by heating the material as received from the manufacturer at 110° C. for at least 16 hours. There is then added to the reaction vessel 450 parts of phenol and 73 parts of toluene. The reaction vessel is then equipped with suitable means for agitating the reaction mixture and a water trap set up for top layer return. With good agitation the mixture is heated to reflux at 115–117° C. to effect drying of the system and when no further water is being removed at this temperature, toluene is allowed to distill off until the temperature of the reaction mixture is raised to 150–155° C. The mixture is then refluxed at this temperature for about 30 minutes with water being removed as it is formed. The mixture is then cooled to 90 to 100° C., and the resin recovered by filtration. The recovered resin has a reasonably satisfactory degree of activity as a catalyst in phenol alkylation reactions. Characteristics of a resin catalyst prepared by this procedure are given in Table 1.

*Procedure B*

The procedure set forth above is repeated except that the reaction mixture is retained at 150–155° C. for 110 minutes. The resin catalyst prepared by this procedure is a very active catalyst in phenol alkylation reactions. Characteristics of a resin prepared in accordance with this procedure are also given in Table 1.

*Procerure C*

The procedure set forth above under A is repeated except that the reaction mixture is retained at a temperature of 150–155° C. for 3 hours.

*Procedure D*

The procedure set forth under A above is repeated except that toluene is removed until the reflux temperature is 170–175° C. and the reaction mixture is retained at this temperature for 3 hours. This procedure results in a resin catalyst with an exceptionally high degree of activity.

*Procedure E*

In a suitable reaction vessel there is placed 80.4 parts of a resin as specified under Procedure A above, 161 parts of dodecene prepared by the polymerization of propylene (propylene tetramer), and 282 parts of phenol. The apparatus is then equipped with means for agitation and a trap arranged for top layer return. With good agitation the mixture is then heated to 170–175° C. and held at this temperature for a total of 120 minutes. Refluxing occurs at first but ceases after about 20 minutes at reaction temperature. Two layers are obtained in the trap, the bottom layer being a mixture of phenol and water. After a total of 120 minutes at reaction temperature, the mixture is cooled and the resin catalyst recovered by filtration.

Aliquot portions of catalysts prepared by each of the above procedures are in each instance placed in a Soxhlet extraction apparatus and extracted with methanol until after drying a constant weight is obtained (usually after 2 to 3 hours extraction time). The extracted resin samples are then dried at 105–110° C. in an air oven for at least 4 hours. The weight of the dried sample is then compared on an appropriate basis with the weight of the starting material used in the preparation of the sample and the increase is considered to indicate the weight of phenol reacted with the starting resin. Results are given in Table 1.

A sample of each of the resin catalysts extracted in accordance with the procedure of the preceding paragraph is mixed with approximately 10 times its weight of sodium chloride in 100 times its weight of water. The resulting salt solutions are, in each instance, vigorously agitated for at least 5 minutes and then titrated with 0.1 N sodium hydroxide to a phenolphthalein end point. This procedure is employed for determining the "apparent acidity" of the resin catalyst and when this term is employed in this specification, it means acidity as determined by this procedure. For comparative purposes an acidity determination is made upon a methanol extracted dry sample of the starting resin material.

A sample of each of the resin catalysts prepared above is extracted with methanol to constant weight and then mixed with 100 times its weight of 0.1 N sodium hydroxide and 8 times its weight of sodium chloride. The resulting mixture is subjected to moderate intermittent agitation for a period of one hour or more and an aliquot portion of the supernatant liquid is titrated with 0.1 N HCl to a phenolphthalein end point. The milligrams of sodium hydroxide consumed by the resin is then calculated and this in each instance is equal to the "total acidity" of the resin. Results are given in Table 1.

TABLE 1

| Procedure | Water Recovered (Parts by Weight) | Apparent Acidity in Milli-equivalents per Gram | Total Acidity in Milli-equivalents per Gram | Weight Gain of Resin in Parts by Weight |
| --- | --- | --- | --- | --- |
| Parent resin | | 5.0 | 5.0 | |
| A | 1.55 | 4.6 | | 2.0 |
| B | 2.82 | 3.7 | 4.6 | 6.0 |
| C | 3.77 | 3.1 | 4.2 | 10.5 |
| D | | 1.8 | 3.3 | 10.6 |
| E | | 2.36 | 3.85 | 7.7 |

The procedure for preparing other resin catalysts according to this invention can be the same as the above and one can, for example, with satisfactory results substitute for the divinyl benzene sulfonated polystyrene resin an equal quantity of a divinyl benzene crosslinked, sulfonated vinyl ethyl benzene resin, or an equal quantity of any other suitable sulfonated aryl resin.

*Example II.—Alkylation*

In a suitable reaction vessel equipped with heating and stirring means, there is placed 50 parts of a catalyst prepared generally in accordance with Procedure E of Example I, 100 parts by weight of nonene, and 170 parts of phenol. The temperature of the reaction mixture is raised to 110° C. and maintained at this temperature for 3 hours with continuous agitation. At the end of this time the reaction mixture is allowed to settle for 15 minutes and the supernatant mixture is removed. Analysis of the reaction product shows that approximately 90% of the olefin material has reacted with the phenol. The activated catalyst is suitable for reuse an almost indefinite number of times.

The above represents a procedure which can be employed with any catalyst according to this invention for alkylating an alkylatable phenolic compound with an olefin material. The procedure of this example has been employed with excellent results in the preparation of other alkylated aromatics, including nonyl phenol, dodecyl phenol, tridecyl phenol, pentadecyl phenol, nonyl cresol, dodecyl cresol, and the substituted phenol resulting from the reaction of phenol with oleic acid. Likewise the same procedure can be employed with satisfactory results when using other types of catalysts, such as, for example, a catalyst comprising a divinyl benzene cross-linked, sulfonated vinyl ethyl benzene resin prepared in accordance with this invention.

Having thus described our invention and several specific embodiments thereof, what we desire to claim and secure by Letters Patent is:

1. A synthetic aryl resin having pronounced catalytic activity in phenol alkylation reactions, said resin being a polymer of a monovinyl aryl compound permeable to organic liquids but sufficiently cross-linked to prevent gel formation in the presence of phenols, at least a portion of the aryl nuclei in said resin being substituted with hydroxyphenylsulfonyl groups, the number of said groups being sufficient to constitute between about 1 and 20% of the total weight of said resin.

2. A synthetic aryl resin as in claim 1 comprising a styrene-divinyl benzene copolymer.

3. A synthetic aryl resin as in claim 2 wherein a portion of said groups are disulfonylhydroxyphenol groups serving in each instance to cross link two aryl nuclei.

4. A synthetic aryl resin as in claim 1 comprising a vinyl ethyl benzene-divinyl benzene copolymer.

5. A synthetic aryl resin as in claim 4 wherein a portion of said groups are disulfonylhydroxyphenol groups serving in each instance to cross link two aryl nuclei.

6. A resin catalyst for use in phenol alkylation reactions, said catalyst comprising discreet particles of a polymer of a monovinyl aryl compound, said polymer being sufficiently cross-linked to prevent gel formation in the presence of phenols but not so highly cross-linked that said particles are impermeable to organic liquids, and said polymer containing groups of the formula:

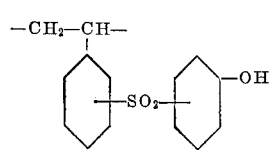

the number of said groups being such that from about 1 to 15% of said polymer, on a dry weight basis, is attributable to phenol nuclei.

7. A resin catalyst for use in phenol alkylation reactions, said catalyst comprising discreet particles of a polymer of a monovinyl aryl compound, said polymer being sufficiently cross-linked to prevent gel formation in the presence of phenols but not so highly cross-linked that said particles are impermeable to organic liquids, and said polymer containing groups of the formulae:

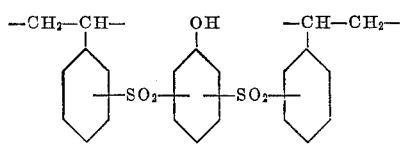

and

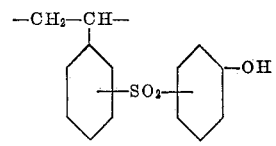

the number of said groups being such that from about 1 to 15% of said polymer on a dry weight basis, is attributable to phenol nuclei.

8. A method of producing a resinous product having a pronounced catalytic activity in phenol alkylation reactions which comprises heating a mixture of phenol and a sulfonated aryl ion exchange resin at a temperature sufficient to result in the chemical release of water, said heating being conducted under conditions such that said water released as a result of chemical reaction is removed from said mixture, and for a time sufficient to result in the release by chemical reaction of an amount of water equal to at least about 0.2% of the dry weight of said ion exchange resin, and said resin being a polymer of a monovinyl aryl compound sufficiently cross-linked to provide dimensional stability in the presence of phenols.

9. A method according to claim 8 wherein said heating is conducted for a time sufficient to result in the release by chemical reaction of an amount of water equal to at least about 1% of the dry weight of said ion exchange resin.

10. A method according to claim 9 wherein said resin is a sulfonated styrene-divinyl benzene copolymer.

11. A method according to claim 10 wherein the divinyl benzene content of said copolymer is sufficient to result in a degree of cross-linkage such as to prevent gel formation by said resin in the presence of phenols but not such as to result in said resin being impermeable to organic liquids.

12. A method of producing a resinous product having a pronounced catalytic activity in phenol alkylation reactions which comprises heating together, at a temperature between about 140° C. and 200° C., a sulfonated aryl ion exchange resin and phenol to effect a condensation reaction between said phenol and said resin, said heating being conducted under such conditions that water formed as a result of said reaction is removed from the reaction mixture, and for a time sufficient to result in the release by chemical reaction of an amount of water equal to at least about 0.2% of the dry weight of said ion exchange resin, and said resin being a polymer of a monovinyl aryl compound sufficiently cross-linked to provide dimensional stability in the presence of phenols.

13. A method according to claim 12 wherein said ion exchange resin is a sulfonated styrene-divinyl benzene copolymer with a divinyl benzene content of from about 2 to 8% by weight and a titratable acidity, in the free acid form, of at least about 1 milliequivalent per gram of dry weight.

14. A method according to claim 13 wherein the reaction is conducted for a length of time sufficient to result in a weight gain by said ion exchange resin, on a dry weight basis, of from about 1 to 20%.

15. A method according to claim 14 wherein said water is removed from said reaction mixture by azeotropic distillation.

16. A method according to claim 15 wherein said reaction is conducted in the presence of an inert hydrocarbon diluent which forms an azeotrope with water.

17. A method according to claim 16 wherein said diluent is toluene.

18. A method according to claim 14 wherein said reaction is performed at a temperature of at least 170° C. and is performed in the presence of an olefin having from 8 to 25 carbon atoms.

References Cited by the Examiner
UNITED STATES PATENTS 2,692,867  10/1954  Passing _____ 260—2.2
2,802,884  8/1957  D'Alelio _____ 260—2.2
3,017,441  1/1962  Thomas _____ 260—671

SAMUEL H. BLECH, *Primary Examiner.*
HAROLD N. BURSTEIN, WILLIAM H. SHORT,
*Examiners.*
J. C. MARTIN, *Assistant Examiner.*